United States Patent
Nichols et al.

(10) Patent No.: US 7,831,464 B1
(45) Date of Patent: Nov. 9, 2010

(54) METHOD AND SYSTEM FOR DYNAMICALLY REPRESENTING DISTRIBUTED INFORMATION

(75) Inventors: Elizabeth A. Nichols, Great Falls, VA (US); Patrick James McNerthney, Makawao, HI (US); Biao Ren, Acton, MA (US)

(73) Assignee: ClearPoint Metrics, Inc., Burlington, MA (US)

( * ) Notice: Subject to any disclaimer, the term of this patent is extended or adjusted under 35 U.S.C. 154(b) by 1252 days.

(21) Appl. No.: 11/278,855

(22) Filed: Apr. 6, 2006

(51) Int. Cl.
*G06F 11/34* (2006.01)
(52) U.S. Cl. ...................................................... 705/11
(58) Field of Classification Search .................. 705/10, 705/11
See application file for complete search history.

(56) References Cited

U.S. PATENT DOCUMENTS

| | | | | |
|---|---|---|---|---|
| 6,578,004 | B1 * | 6/2003 | Cimral et al. | 705/7 |
| 2002/0035495 | A1 * | 3/2002 | Spira et al. | 705/7 |
| 2003/0061225 | A1 * | 3/2003 | Bowman et al. | 707/100 |
| 2003/0065613 | A1 * | 4/2003 | Smith | 705/38 |
| 2003/0083918 | A1 * | 5/2003 | Hoffman et al. | 705/8 |
| 2004/0068429 | A1 * | 4/2004 | MacDonald | 705/10 |
| 2004/0210574 | A1 * | 10/2004 | Aponte et al. | 707/5 |
| 2004/0230463 | A1 * | 11/2004 | Boivin | 705/7 |
| 2005/0071737 | A1 * | 3/2005 | Adendorff et al. | 715/500 |
| 2005/0096950 | A1 * | 5/2005 | Caplan et al. | 705/7 |
| 2005/0209946 | A1 * | 9/2005 | Ballow et al. | 705/35 |
| 2006/0161471 | A1 * | 7/2006 | Hulen et al. | 705/10 |
| 2006/0242261 | A1 * | 10/2006 | Piot et al. | 709/217 |
| 2006/0267999 | A1 * | 11/2006 | Cash et al. | 345/581 |
| 2007/0112607 | A1 * | 5/2007 | Tien et al. | 705/7 |

OTHER PUBLICATIONS

"ClearPoint Metrics Releases the First Automated Security Metrics Solution to Reduce Risk and Cost Metrics Accelerator (Mx) Enterprise Software Platform Automates the Design, Orchestration and Production of Security Performance Metrics." PR Newswire, May 22, 2006.*

* cited by examiner

*Primary Examiner*—Susanna M Diaz
(74) *Attorney, Agent, or Firm*—Wixi Sino IP Agency, Ltd.; Joe Zheng

(57) ABSTRACT

Techniques for dynamically representing distributed information are disclosed. According to one embodiment, metrics for deployed resources in a predefined environment (e.g., an enterprise) is designed. The metrics includes at least various logic and data sources and is deployed as one or more Metrics Definition Packages (MDP), wherein data sources are used for calculating such metrics. The metrics is defined in terms of the data sources and their associated meta-data, but has no dependency upon specific external systems that are eventually used to populate the data sources when the Metrics Definition Package is executed. The metrics results from the execution of the Metrics Definition Package in accordance with the deployed resources (e.g., storage space, and security means) are represented in what is referred to as a Scorecard Definition Package (SDP) that is designed to represent the metrics results in a dynamic and comprehensible manner.

23 Claims, 18 Drawing Sheets

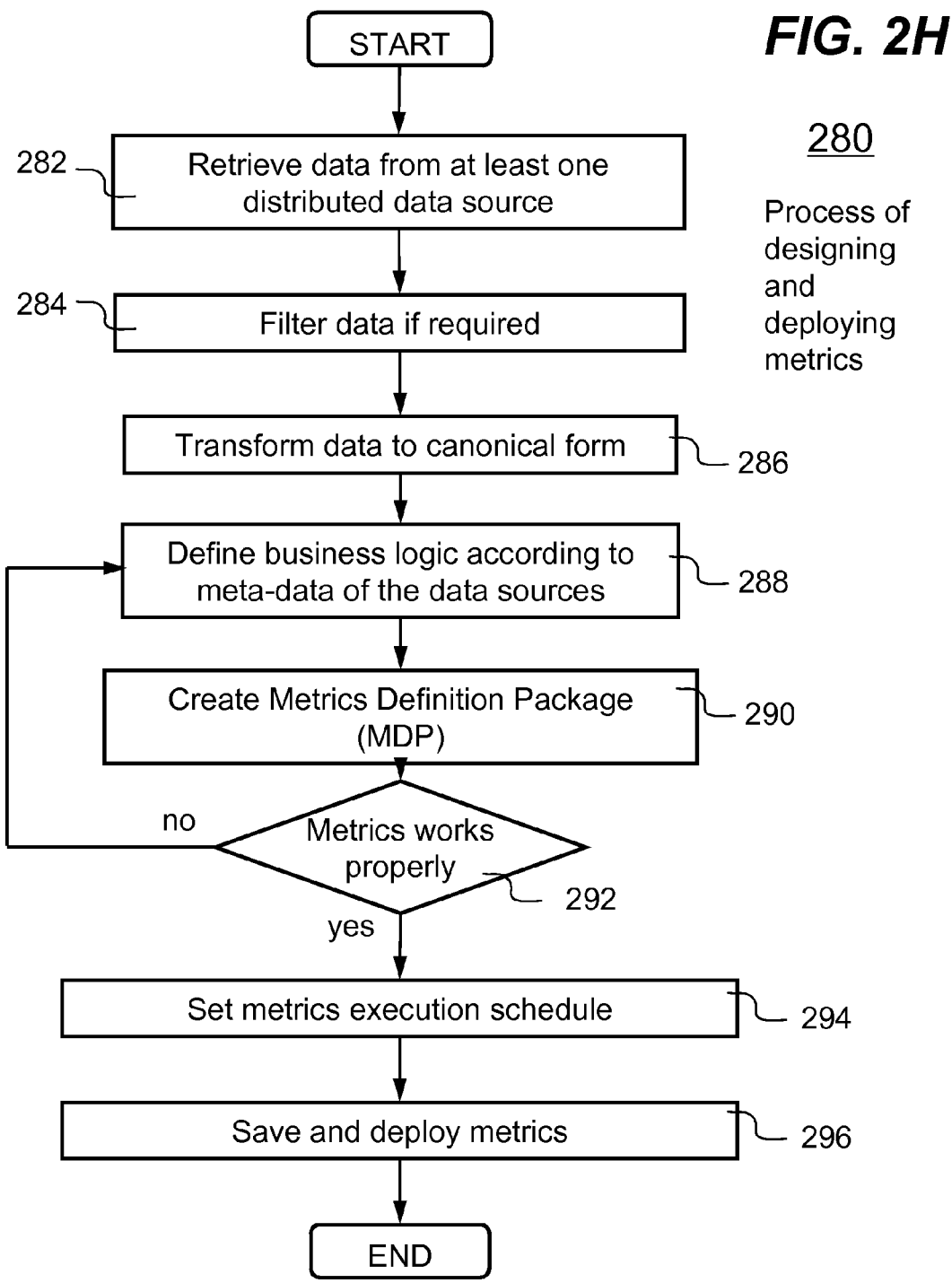

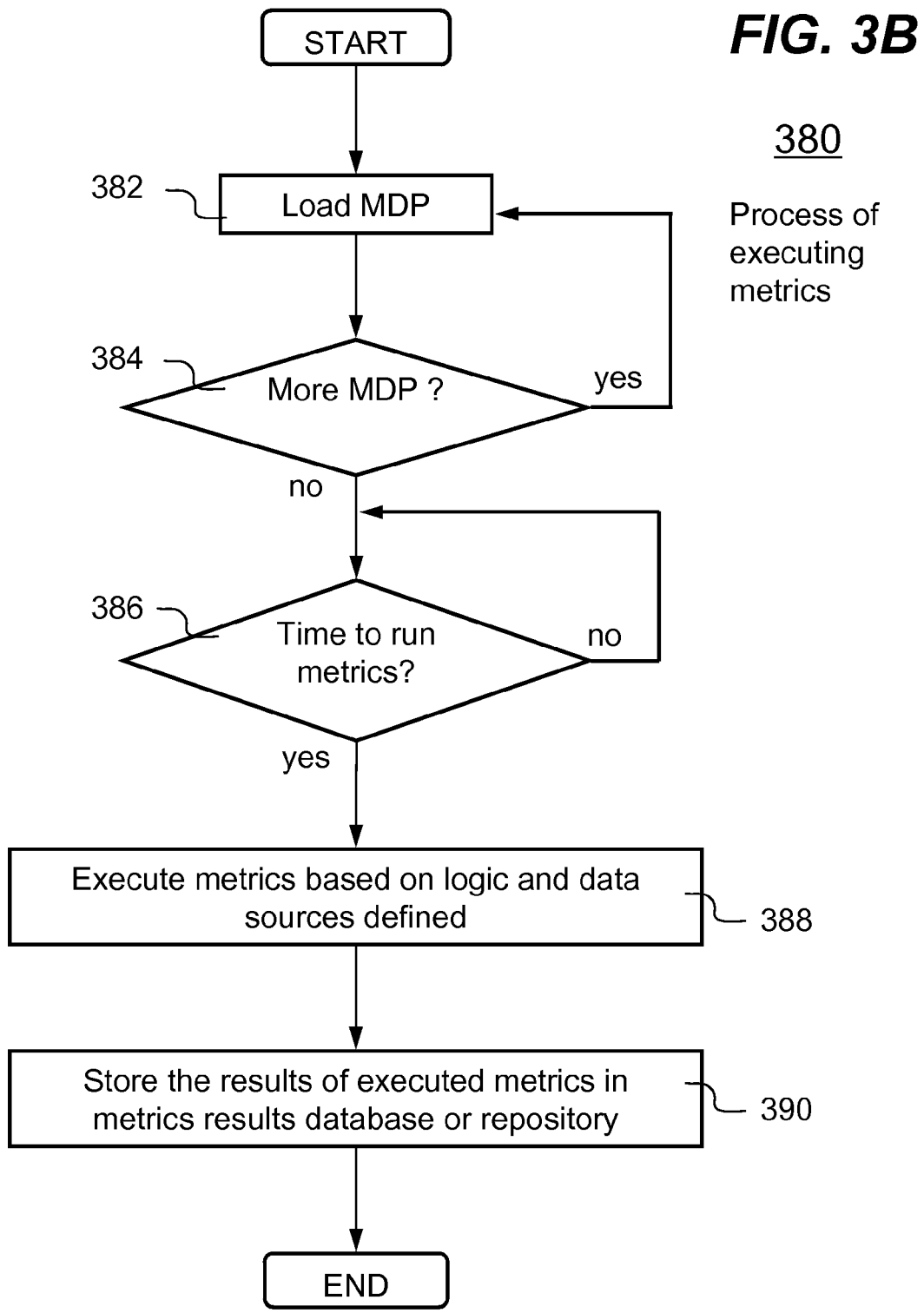

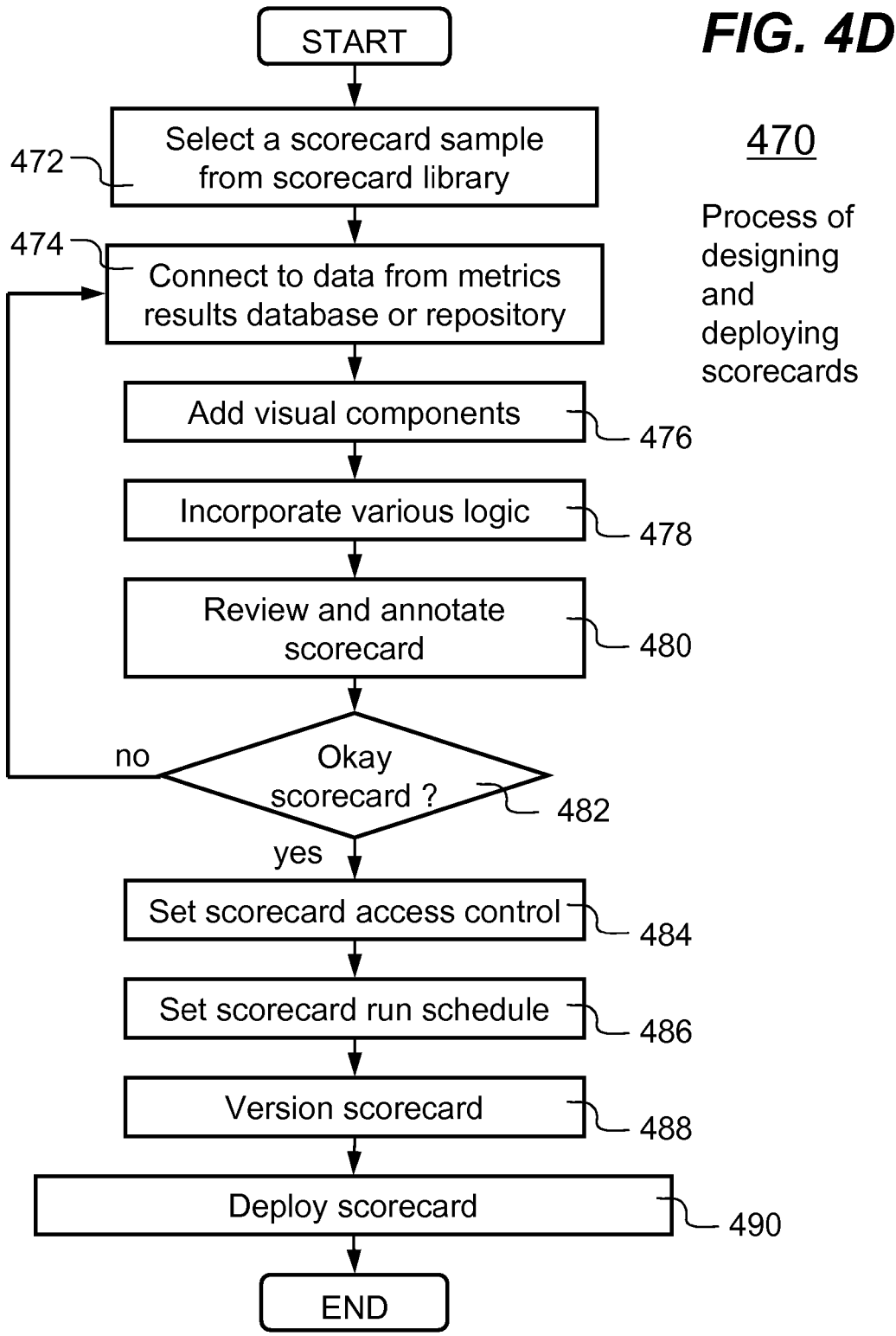

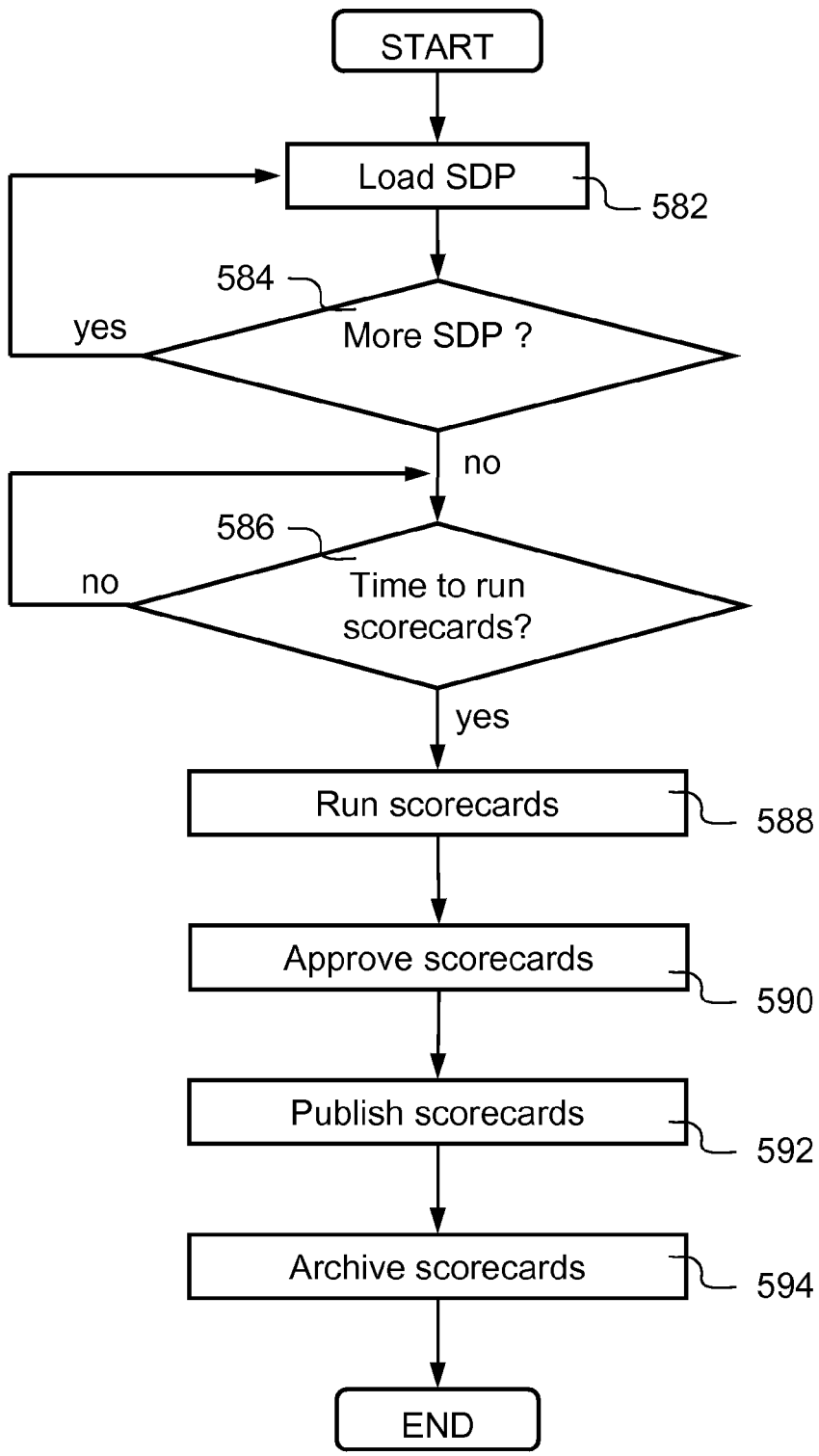

METHOD AND SYSTEM FOR DYNAMICALLY REPRESENTING DISTRIBUTED INFORMATION

BACKGROUND OF THE INVENTION

1. Field of the Invention

The present invention generally relates to the area of information management. Particularly, the present invention relates to a method and system for dynamically representing distributed information, and more particularly, the present invention relates to metrics of IT systems and business processes in an enterprise environment.

2. Description of the Related Art

Many businesses are spending significant resources on various projects and initiatives. But there is no repeatable, auditable, reliable, controllable, automated, efficient or effective means to measure, monitor, and publish the performance, effectiveness, efficiency, and progress of such efforts. For example, a corporation desires to heighten the security of corporate data by deploying more than 50 distinct classes of component and instrumenting a range of business processes related to such an effort. The exemplary components may include routers, firewalls, anti-virus software, web caches, web servers, network and system management software, applications servers, ERP systems, Customer Relationship Management (CRM) systems, application middleware, and databases. Related business processes may include making it mandatory to use a secure channel to login to any corporate servers, and requiring user password to be changed every 2 weeks to ensure password hygiene, among others. Assessing the performance of such a project or initiative is a very challenging task without an effective tool. The current practice for conducting a survey of security performance is unsatisfactory and relies largely on ad-hoc approaches that involve manual, piecewise automation, and/or the combination of both. Therefore, there is a need for techniques that provide rigorous, systematic, and automated monitoring and measurement of projects or initiatives (e.g., security, vulnerability, service level management, corporate governance, etc.) and represent the measurement effectively.

SUMMARY OF THE INVENTION

This section is for the purpose of summarizing some aspects of the present invention and briefly introducing some preferred embodiments. Simplifications or omissions in this section as well as in the abstract and the title herein may be made to avoid obscuring the purpose of the section. Such simplifications or omissions are not intended to limit the scope of the present invention.

The present invention discloses a method and system for dynamically representing distributed information pertaining to deployed resources. According to one aspect of the present invention, metrics are designed to derive attributes associated with deployed resources in a predefined environment (e.g., an enterprise). Metrics include at least various business logic and data source specifications and are deployed as one or more Metrics Definition Packages (MDP), wherein data sources are used to facilitate the designs of such metrics. According to another aspect of the present invention, metrics are defined in terms of the schema or meta-data of the data sources, but have no dependency upon specific external systems that are eventually used to populate the data sources when the business logic associated with a metrics definition package (MDP) is executed.

Metrics results from the execution of Metrics Definition Package (MDP), within the context of a specific enterprise with specific external systems, are represented in what is referred to as a Scorecard Definition Package that is designed for presenting the results in a dynamic and comprehensible manner.

According to still another aspect, the present invention enables separate design, deployment and execution of one or more business metrics as one or more MDPs. Each of the MDPs is designed to use software modules that allow the following: mapping of raw data from external systems to one or more reference data schemas, transforming and joining data from one or more distributed data sources, creation of various logic, computation, business workflows, combination with supplemental data, scheduling, and various permission and entitlement rights. External systems may include, but not limited to databases, spreadsheets, files, audit logs, syslog data streams, agents, various systems, financial and costing reports, manually entered data and any additional data. The deployed MDPs are loaded and executed individually or collectively on a computing server in accordance with the schema or meta-data of the data sources, logic and schedules as defined within the MDPs. The executed metrics results are stored in a secured metrics results database or repository that can be accessed later by one or more scorecards associated with a particular business framework.

According to still another aspect, the present invention enables separation of designing, testing, reviewing, annotating, approving, versioning, deploying, executing, publishing, and archiving one or more scorecards. According to yet another aspect, the present invention enables the business logic, graphical charting logic, review workflow definition, publication logic, notification logic, and access entitlements for a scorecard to be compiled into a Scorecard Definition Package (SDP). One or more Scorecard Definition Packages (SDPs) are deployed into production in a manner that supports clear separation of metric results computation (according to MDPs) from metric results publication (according to SDPs). Scorecards are designed to use data from one or more metrics results and visual components (e.g., icons, graphs, charts, etc.). Each scorecard is reviewed, annotated and approved before it is versioned, published and, eventually, archived. The deployed SDPs are executed on a computing device in accordance with the specifications defined. Then the generated scorecards are reviewed, approved, versioned, published and archived. The published results in form of scorecard editions can be tracked, verified, repeated and audited on a consistent basis.

The present invention may be implemented in software, hardware or a combination of both as a method, a process or a system. According to one embodiment, the present invention is a method for dynamically representing distributed information. The method comprises the following: 1) one or more metrics are created and packaged into one or more Metrics Definition Packages that unambiguously specify metrics execution schedules, relationships or logic among data sources and metrics logic; 2) deployed Metrics Definition Package are executed based on metrics schedules against data in external systems in a predefined environment to produce executed metrics results; and 3) executed metrics results, visual components and business logic are used to form one or more Scorecard Definition Packages (SDPs), which are the base containers for presentation. The linkage and relationship between SDPs and various raw data from external sources provide the core capability of dynamically representing distributed information.

According to another embodiment, the present invention is a system for dynamically representing distributed information, the system comprises the following: 1) one or more first computing device(s) configured to design one or more metrics as a Metrics Definition Package that defines metrics execution schedules, relationships or logic of data sources and metrics logic; 2) one or more second computing device(s) deployed with the Metrics Definition Package(s) and configured to execute the Metrics Definition Package(s) based on the metrics execution schedules to produce metrics results, wherein the second device is coupled to a plurality of deployed resources in a predefined environment; and 3) one or more third computing device(s) configured to represent the executed metrics results in at least one Scorecard Definition Package that includes various visual components and logic so that the executed metrics results are presented. The second computing device may be coupled to a storage device that accumulates the executed metrics results to be accessed by the third computing device. Depending on applications, the first/second computing device and third computing device represent a logical division or layering: these devices can live either in a single physical server or be on separate servers.

One of the objects, features, and advantages of the present invention is to provide techniques for dynamically representing distributed information.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIG. 2H shows a flowchart or process for designing and deploying metrics in form of Metrics Definition Package (MDP) in accordance with one embodiment of the invention;

FIG. 3B shows a flowchart or process 380 for executing defined metrics in accordance with one embodiment of the invention;

FIG. 4D shows a flowchart or process for designing and deploying scorecards in form of Scorecard Definition Package (SDP) in accordance with one embodiment of the invention;

FIG. 5B shows a flowchart or process for running and publishing scorecards in accordance with one embodiment of the invention.

DETAILED DESCRIPTIONS OF THE PREFERRED EMBODIMENTS

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-5B. However, those skilled in the art will readily appreciate that the detailed description given herein with respect to these figures is for explanatory purposes as the invention extends beyond these limited embodiments.

Figure 1A:
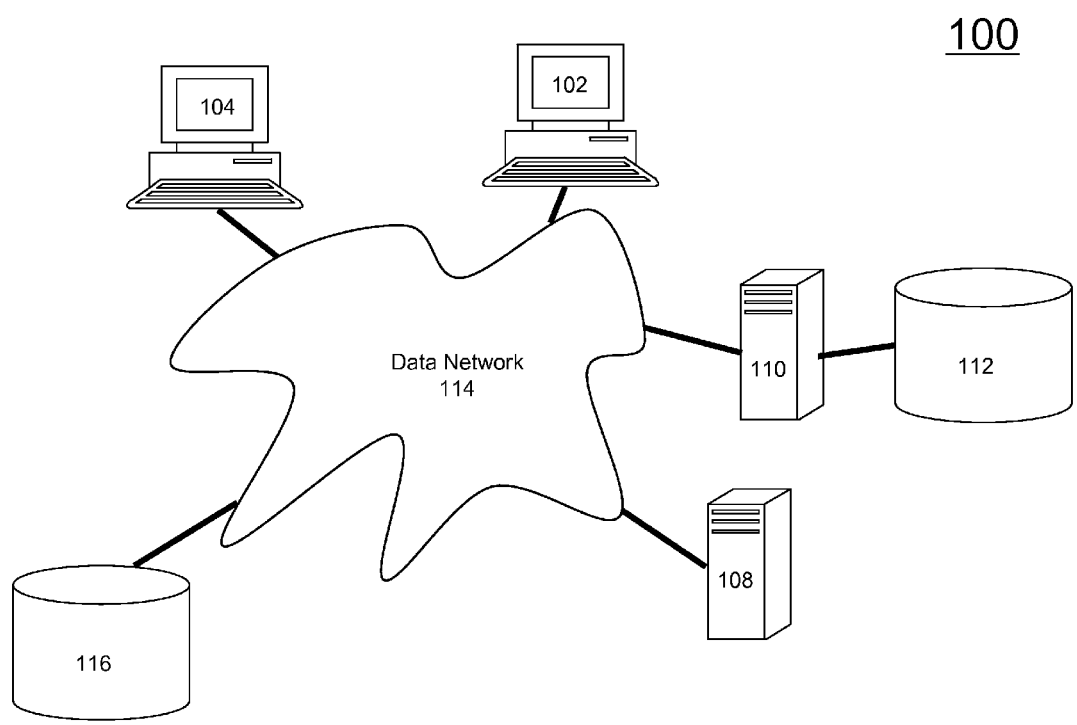
FIG. 1A shows an exemplary network environment in which one embodiment of the present invention may be implemented.

Referring now to the drawings, FIG. 1A depicts a networked computing environment 100, in which one embodiment of the present invention may be practiced. There are a number of exemplary network capable devices 102, 104, 108, 110, 112 and 116 coupled to a data network 114. The computing devices 102 and 104 are desktop, laptop, and/or handheld computing device with I/O capabilities (i.e., keyboard, mouse, monitor, etc.). The devices 108 and 110 are computing servers (e.g., a web server, a database server, an application server, etc.). The device 116 is a network capable storage device (e.g., NAS or SAN). A direct attached storage 112 is coupled to the server 110. Although there are two computing servers and two computing devices with I/O capability shown in FIG. 1A, the present invention can be practiced in a network environment with many more of such devices coupled thereto.

In one embodiment of the present invention, either one of the computing devices 102 and 104 is used for designing and deploying metrics and scorecards as one or more Metrics Definition Package (or MDP) and Scorecard Definition Package (or SDP), respectively, based on schema or meta-data of various distributed data sources. One or more distributed data sources are located at various computing devices (not shown) coupled to the data network 114 or provided by different sources.

In another embodiment, either one of the devices 102 and 104 is used for viewing the published scorecards. For example, the device 104 may be a web client in which a browser is executed to view the published scorecard as a web page on a web server 108. Either one of the storage devices 116 and 112 may be used for storing MDPs, or SDPs, hosting metrics results database or repository and/or archiving scorecards of various versions. The computing servers 108 and/or 110 may be used for executing designed metrics or running scorecards. The server 110 may also be a database server hosting database on the direct attached storage 112 or on the networked storage 116.

Depending on implementation, the servers 108 and 110 may be independent servers that perform computations or analyses separately or collaboratively. The data from distributed data sources can be processed locally without transmitting the sensitive data over the data network 114 to a centralized server, thus avoiding unnecessary data traffics and additional security risks.

Figure 1B:
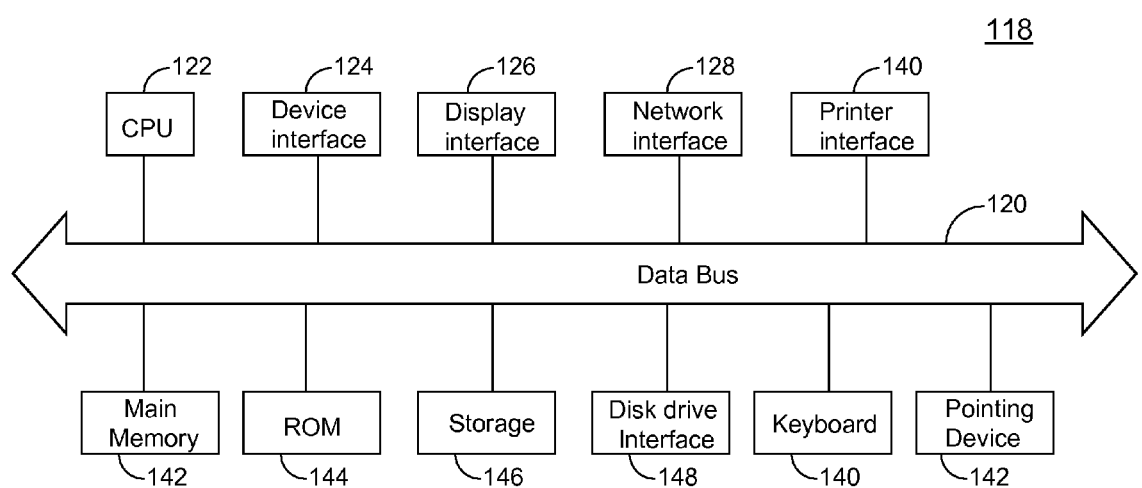
FIG. 1B shows a block diagram of an exemplary computer in which one embodiment of the present invention may be implemented.

The present invention may be implemented in software, hardware or a combination of both. In one embodiment, the invention is directed towards one or more computer systems capable of carrying out at least some or all of the functionalities described herein. FIG. 1B shows exemplary internal construction blocks of a system 118 in which the present invention may be implemented and executed. The system 118 may correspond to one of the machines shown in FIG. 1A. As shown in FIG. 1B, the system 118 includes a central processing unit (CPU) 122 interfaced to a data bus 120 and a device interface 124. The CPU 122 executes certain instructions to manage all devices and interfaces coupled to data bus 120 for synchronized operations. The device interface 124 may be coupled to an external device such as another computing machine hence one or more resources in the computing machine may be utilized. Also interfaced to the data bus 120 is a display interface 126, a network interface 128, a printer interface 140 and a disk drive interface 148. Generally, a compiled and linked version, an executable version, or a software module implementing one embodiment of the present invention is loaded into the storage space 146 through the disk drive interface 138, the network interface 128, the device interface 124 or other interfaces coupled to the data bus 120.

The main memory 142 such as random access memory (RAM) is also interfaced to the data bus 120 to provide the CPU 122 with the instructions and access to storage space 146 for data and other instructions, applications or services. In particular, when executing stored application program instructions, such as the software module of the present invention, the CPU 122 is caused to manipulate the data to achieve results contemplated by the present invention. The ROM (read only memory) 144 is provided for storing invariant instruction sequences such as a basic input/output operation system (BIOS) for operation of the keyboard 140, the display 126 and the pointing device 142, if there are any. In general, the system 118 is coupled to a network and configured to provide one or more resources to be shared with or executed by another system on the network or simply as an interface to receive data and instructions from a human being.

In one embodiment, the system 118 is a computer corresponding to one of the devices 102 and 104 and configured to perform data retrieval from different data sources, filtering or cleansing the data and transforming the data into some types of format to facilitate further processing. Depending on applications, a user may design various business logic and rules to combine, comprehend or analyze the data and come up with a data package that may be deployed in a real environment (e.g., an enterprise environment).

In another embodiment, the system 118 is a server corresponding to a device 108 or 110 and configured to perform data retrieval from deployed resources, compute or analyze the deployed resources in accordance with the data package and collect the results in a storage space for presentation.

In still another embodiment, the system 118 is a computer corresponding to one of the devices 102 and 104 and configured to design a presentation (e.g., a scorecard) from the collected results in accordance with various inputs (e.g., desired formats, schedules, and/or details) from a user.

In yet still another embodiment, the system 118 is a computer configured to display the presentation, and allow a user to expand or browse the presentation as desired. In one application, the system 118 is configured to display metrics of comprehensive IT infrastructure protection in an enterprise environment, its resiliency and operational risk assessment. In another application, the system 118 is configured to analyze deployed resources and present effectiveness in critical business areas, such as disaster recovery, storage management, compliance and audit, contingency planning and risk modeling and management.

Figure 2A:
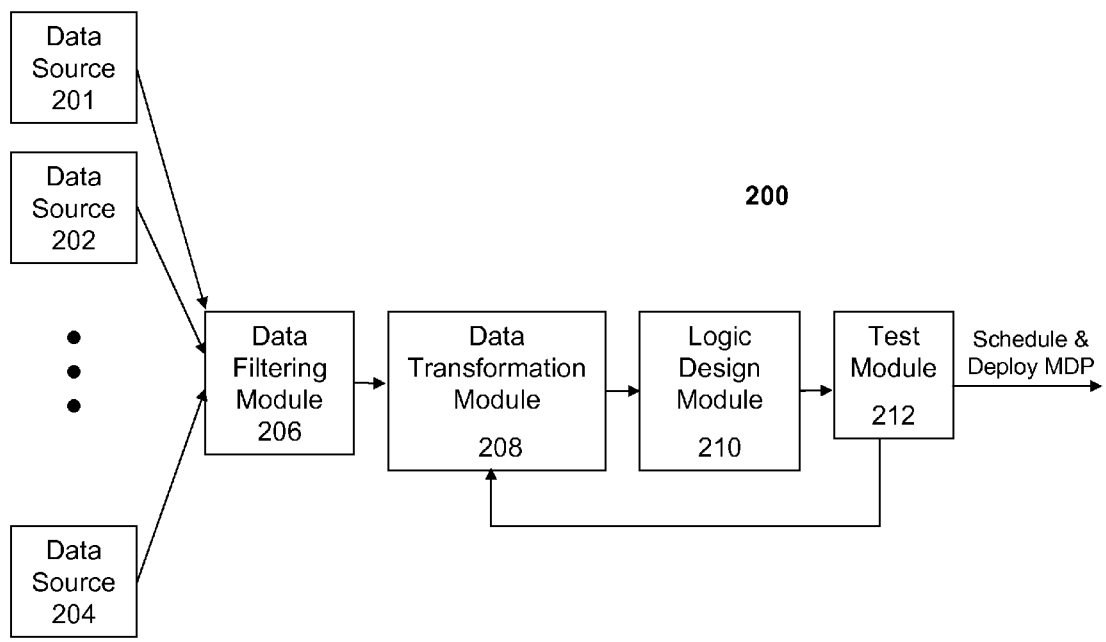
FIG. 2A shows a block diagram of metrics design and deployment in accordance with one embodiment of the invention.

FIG. 2A shows a functional block diagram 200 of metrics design and deployment in accordance with one embodiment of the present invention. The metrics are designed with reference to a plurality of data sources and subsequently deployed as an MDP, which includes various business logic in terms of schema or meta-data and/or logic between any two of the data sources or among any of the data sources with or without other supplemental data or logic. Depending on implementation, the MDP may also include formulas or logic representations to facilitate various computations and/or manipulations of the data sources with or without other supplemental data or logic. As used herein, the business logic is defined as various operations among various distributed resources in terms of schema or meta-data. Examples of the business logic include arithmetic, analytic and logic operations among the data sources. Further examples may also include actionable notations and remediable actions along a workflow. According to one application, the business logic is designed to notify a responsible person by email when a virus is detected on a specific local area network. According to another application, the business logic is designed to report effectiveness in terms of traffic or usage versus costs after an extra network server is deployed, the business logic is also designed to report a trend of when or how another extra network server may be deployed.

According to one embodiment as shown in FIG. 2A, the design of an MDP requires receiving relevant data from a number of data sources 201, 202, . . . , and 204, which may represent business data that may include, but not be limited to, heterogeneous databases, spreadsheets, log files, human resources data, customer support data, security access data, password audit report data, and etc. One example of the data sources is server features provided by a server company (e.g., Cisco Systems), at least some of the features are relevant to the servers deployed in an enterprise for which an MDP is designed. Another example of the data sources is security features provided by a security company (e.g., Symantec Corporation), at least some of the features are relevant to the security means deployed in an enterprise for which an MDP is designed.

In any case, the data from various data sources may require filtering or cleansing by a data filtering module 206 to get rid of inappropriate data such as irrelevant data, confusing or incorrect data, blanks, or those that may cause errors. Depending on implementation, the data filtering module 206 may be configured to perform data filtering operations automatically and/or manually. Examples of data filtering may include, but not be limited to, eliminating clearly inaccurate or missing data, correcting obvious mistakes, sometimes, calculating statistics such as mean, standard deviation or Z-score, and applying policies to assign status values (e.g., red, yellow, green) or key performance indicators or grades (e.g., A, B, C, etc.). In accordance with a specific application, various expectations, restrictions or conditions may be imposed upon the data sources 201, 202, . . . , and 204 through appropriate schema or meta-data. As a result, the data filtering module 206 outputs refined data sets.

The refined data sets are then provided to a data transformation module 208 that is configured to ensure that the data from different data sources are in substantially similar formats or the data from the different data sources is grouped one way or another, or the corresponding similar data is associated together through a mapping function, which can be performed in a number of ways. In one embodiment, the data of same category in the account information from TAM (Tivoli Access Manager) is reordered to match those in the ADS (Active Directory Server). In another embodiment, the account information from both systems are mapped to a "canonical" data format to suit the MDP is designed for. The "canonical" data format is a data definition used in an MDP independent of any data sources; therefore, a data mapping is required to ensure the data from the data sources are transformed.

For a specific example, user accounts information in both Microsoft ADS (Active Directory Service) and IBM TAM (Tivoli Access Manager) are used in designing a type of metrics. These two systems store similar user information (e.g., first name, last name, password, email address, login name, department, etc.) in different format and order. According to one embodiment, the data transformation is also viewed as a data enrichment step that often involves the fusion of data across two or more data sources. An example of this is using data from a Human Relations database to enrich account login data from an Identity Management System. This type of enrichment operation is necessary to determine how many terminated/departed employees still have active login accounts.

The logic design module 210 is provided to define or design various business logic or workflows to fulfill the requirements under a particular business framework (e.g., security). Examples of the logic may include, but not be limited to various manipulations of the data sources such as calculating mean, standard deviation or Z-score, applying models for forecasting, correlating or anomaly detecting, aggregating details into higher level summaries, and applying policies to assign status values (e.g., red, yellow, green) or key performance indicators or grades (e.g., A, B, C, etc.). In one embodiment, particular logic may require joining data from two different data sources together with a reference key as shown in FIGS. 2D-2G. In another embodiment, some data sets are derived or computed from one or more data sources. In still another embodiment, data either from one or more of the data sources or supplied from a user or a device are produced pending some conditions or computations. The result from the logic design module 210 is encapsulated in what is referred to herein as one or more Metrics Definition Packages (MDPs).

Before deploying an MDP, the metrics therein need to be tested until it actually produces the intended results. A test module 212 is provided to test what the MDP is intended to. In one embodiment, the test module 212 is provided with samples of actual deployed resources. The deployed resources are those that are actually being used in a predefined environment (e.g., an enterprise). In any case, the MDP is so designed to provide metrics or a comprehensive overview of deployed resources in terms of, for example, performance, effectiveness, costs, trend and etc. In another embodiment, the test module 212 is tested against some synthetic data. One of the key features in the present invention is that an MDP has no dependency upon specific external systems that may be used to populate the data sources (sets) when the resultant MDP(s) is executed.

The data transformation module 208, the logic design module 210 and the test module 212 form an iterative process that may be repeated as necessary. The iterative process includes one or more modifications in the data transformation module 208 or the logic design module 210 until one or more desirable MDPs are produced via the test module 212. Once an MDP is tested and verified to produce the desired results, the metrics in form of MDP can be scheduled and deployed for a computing server (e.g., server 110 of FIG. 1A) to access and execute.

Figure 2B:
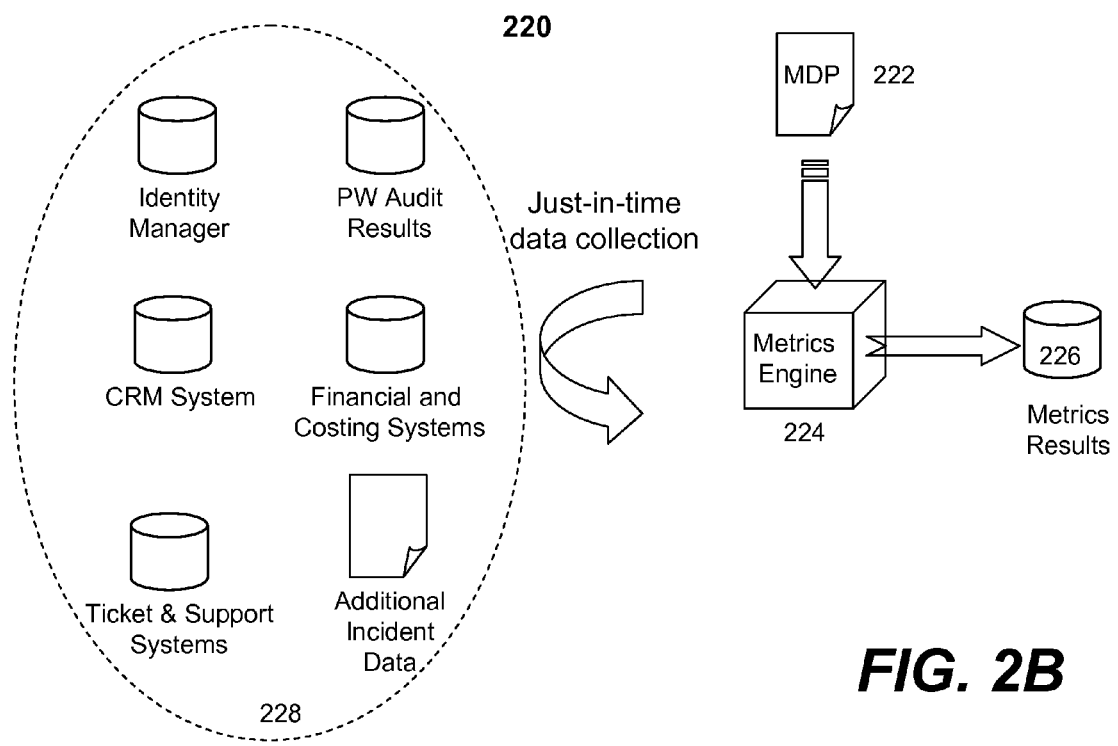
FIG. 2B shows a configuration in which the present invention is practiced.

FIG. 2B shows a configuration 220 in which the present invention is practiced. One or more designed MDPs 222 are loaded into a metrics engine 224. In general, the metrics engine is a software module executing the MDP 222 in a server (not shown) according to a schedule (e.g., every 12 hrs or two days). The server may be loaded with, coupled to, receiving or outputting, or executing various systems, modules, data or devices, collectively referred to as deployed resources 228. Upon an appropriate time in the schedule, the metrics engine 224 collects various data from the deployed resources 228 and proceeds with the metrics analysis or computations in accordance with the MDPs 222. In one embodiment, an MDP is in XML (eXtensible Markup Language) form. However, an MDP can be in other forms, such as binary form. The metrics engine 224 is implemented as an interpreter that executes the MDP. Subsequently, the metrics results 226 are produced, and preferably stored in a storage space. In operation, it is likely that the metrics engine 224 is repeatedly executed according to the schedule. The metrics results 226 may be accumulated in the storage space with a time stamp and conditions at the time the metrics engine 224 is activated, resulting in different versions of the metrics results 226.

To avoid obscuring aspects of the present invention, various examples in which the metrics may be designed for are omitted. However, it should noted that some of the features of the metrics designs according to the present invention include at least the following:

Portability:
Metrics are defined in terms of the schema or meta-data of the data sets needed to drive them. This specification has no dependency upon specific external systems that may be used to populate the data sets when the resultant MDP(s) is executed. Metrics are bound to a customer unique set of authoritative data sources when the MDP is deployed. This enables metrics logic in the MDP to be equally applicable to any other customer environments that can identify substantially similar authoritative data sources for each required input data set.

Autonomy:
The metrics are packaged as an autonomous entity whose only external dependency is the data sources required to populate its input data sets. By imposing this requirement, the management of the metrics is greatly simplified, and sharing of the metrics between independent designers is facilitated.

Scalability:
The metrics do not always require a data warehouse to run. The metrics can mine data at the edge of the metrics network in which they run. This means that sensitive data is localized typically to a single node and that retained data is limited strictly to the results of the metrics computation, not all the detailed data may have been used to create it. External data sources provide precisely the data needed to compute a metrics, drastically reducing the amount of data used.

Separation:
The environment for designing metrics is physically and logically distinct from the environment in which the metrics execute to generate results. Thus there are two separate operational states, Design and Production Operation as well as Computation and Publication. In Design and Production Operation, the introduction of new metrics and their resultant data into production operations can be carefully controlled. Specifically, versioning of metrics business logic and assuring the collected results are consistently generated are two key functions that are facilitated by this separation. In Computation and Publication, all compute logic for a metrics is encapsulated within the metrics business logic and placed under strict version control. The incorporation of computational operations within any publication function is prohibited. This has the key consequence of ensuring consistency and audit ability of all published metrics results. It also ensures that all metrics results are available to the widest possible range of publication facilities without any dependence upon computational idiosyncrasies embedded in publication logic.

Figure 2C:
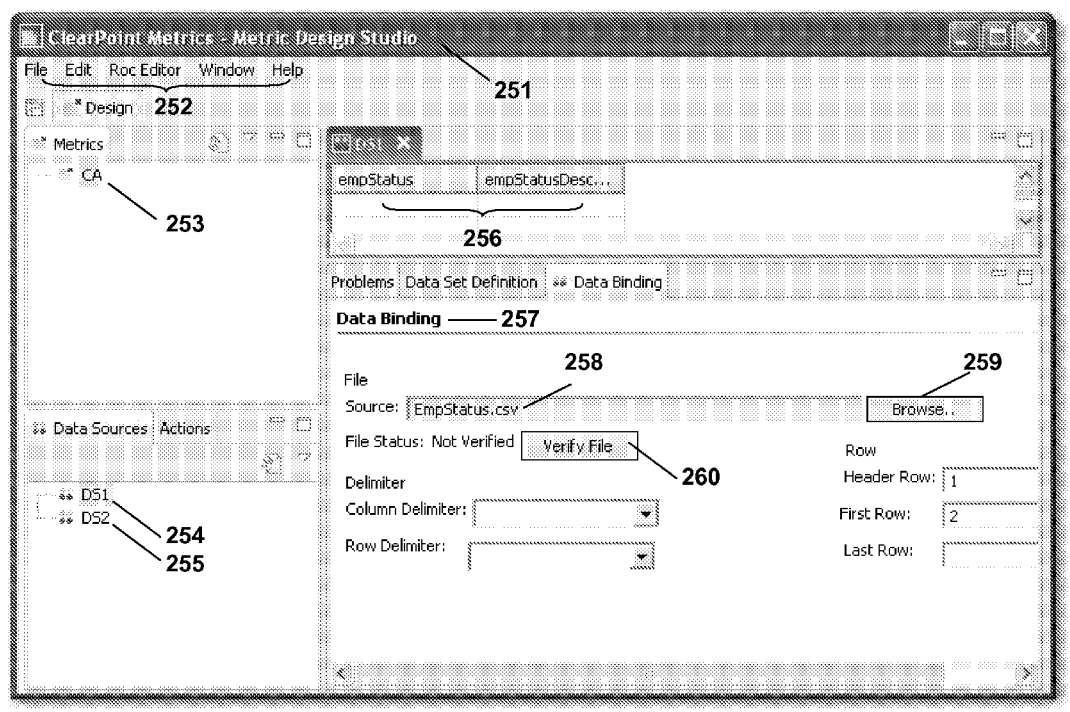
FIGS. 2C to 2G show several exemplary user interfaces of designing and deploying a metrics in form of an MDP in accordance with one embodiment of the invention.

FIGS. 2C-2G show collectively an environment of designing an MDP. Several exemplary user interfaces for designing and deploying metrics in form of an MDP in accordance with one embodiment of the invention are respectively shown. A user interface 250 of a software module called "Metrics Design Studio" 251 is shown in FIG. 2C. The interface 250 includes several functional areas, such as "Metrics" for what is being designed, "Data Sources" for what data sources are being depended upon, data binding for designed logic. In particular, the user interface 250 for designing the metrics is divided into four panels: the upper left panel shows the metrics being designed called CA 253; the lower left panel shows two data sources, DS1 254 and DS2 255, being used in the designing phase, the upper right panel lists schema or meta-data of data source DS1 254 which contains two columns of data: empStatus and empStatusDesc 256; and the lower right panel shows that the actual data file called EmpStatus.scv 258 is connected or bonded with data source DS1 254 via Data Binding 257. It should be noted that empStatus and empStatusDesc are two columns of schema or meta-data provided in the data sources, DS1 254 and DS2 255. In other words, the displayed information as referenced by 256 changes with the data sources being used.

There are a number of other options in the Data Binding panel 257. One of them is Browse 259, which can be used for browsing the file system in the hard disk to locate an actual data file. Another function called Verify File 260 is used for verifying whether Data Binding works properly for a selected actual file. Other functions are provided for defining the category header, real data, etc.

Figure 2D:
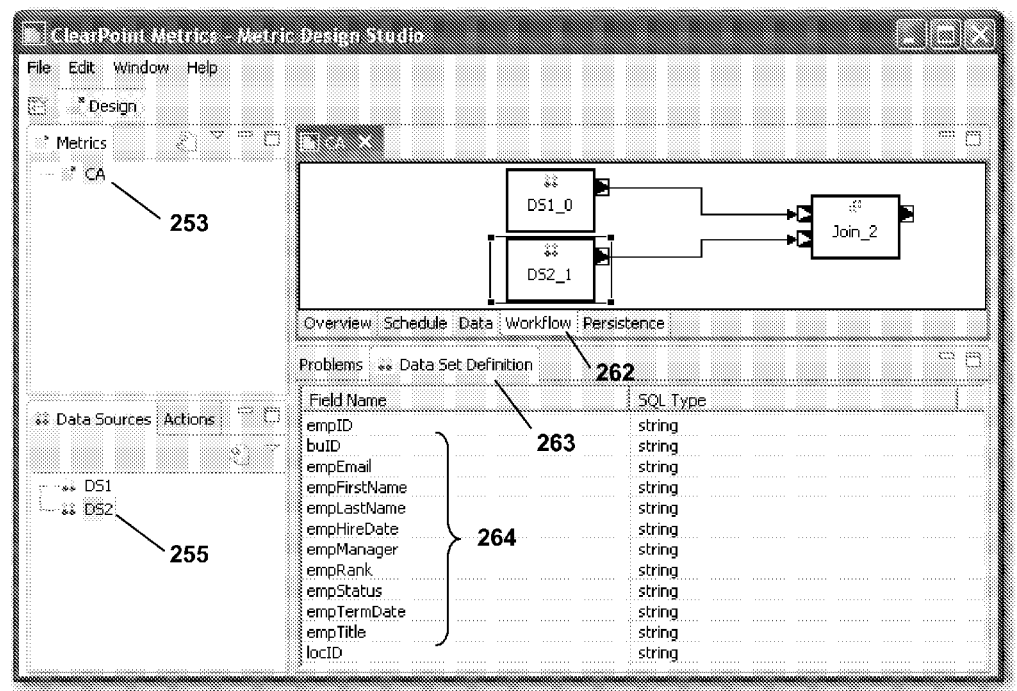

FIG. 2D shows the same user interface 250 with a different view or status. The logic designs for the metrics CA 253 is represented by a workflow 262, which is shown as two data source icons DS1_0 and DS2_1 joined together by a Join_2 icon in the upper right panel. In operation, it means two data sources are being measured jointly. In addition, the data set definition 263 of data source DS2 255 is listed as a column of schema or meta-data 264 (e.g., empID, buID, empEmail, empFirstName, etc.) in the lower right panel to show the data categories in one of the data sources DS2 as DS2 is selected in either the Data Source or the workflow 262.

Figure 2E:
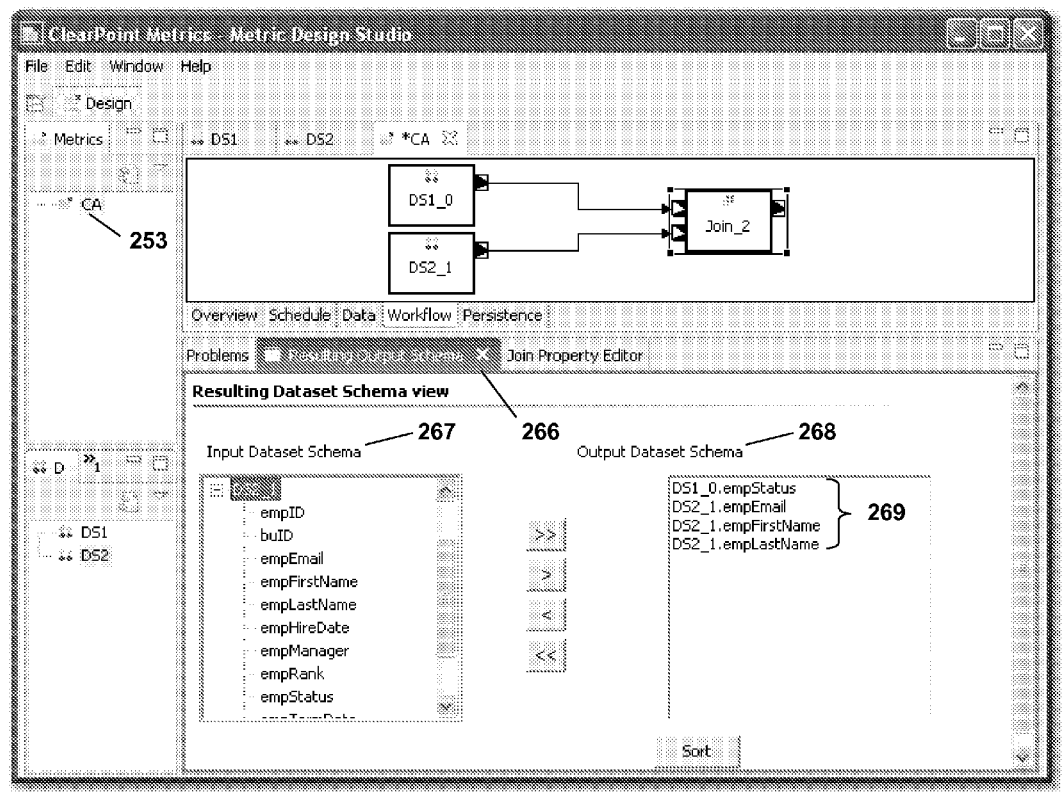

FIG. 2E illustrates the same workflow of FIG. 2D in the upper right panel with the resulting output schema 266 listed in the lower right panel. It is shown that a user is given a number of choices to select interactively any of the data definitions from Input Data Schema 267 to Output Data Schema 268. In one embodiment, the exemplary data definitions 269 (i.e., DS1_0 empStatus, DS2_1 empEmail, DS2_1 empFirstName, and DS2_1 empLastName) are selected for the metrics CA 253.

Figure 2F:
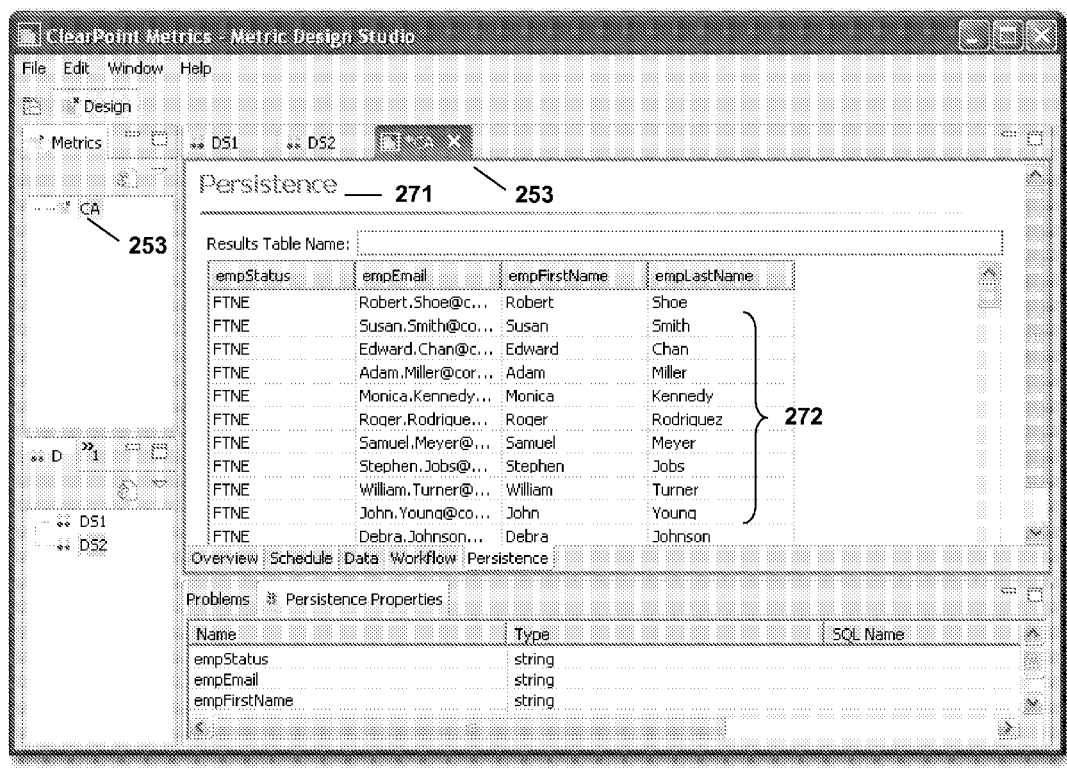

FIG. 2F shows that a test execution results of the metrics CA 253 based on the data sources and the workflow logic defined in FIGS. 2C-2E in the upper right panel. The test results are listed in form of the actual data 272 from various data sources as Persistence 271. In other words, the test results are the actual data 272 that satisfies Output Data Schema 268. For example, the reason that "Robert Shoe" and "Susan Smith" are included in the test results is because both records show the respective empStatus column as FTNE, where FTNE, full time non-exempt, is one of the employee status listed in file empStatus.csv. As a result, first name, last name, employee status along with the email addresses is listed in the test results for those employees in file employee.csv having an empStatus defined in file empStatus,csv.

Figure 2G:
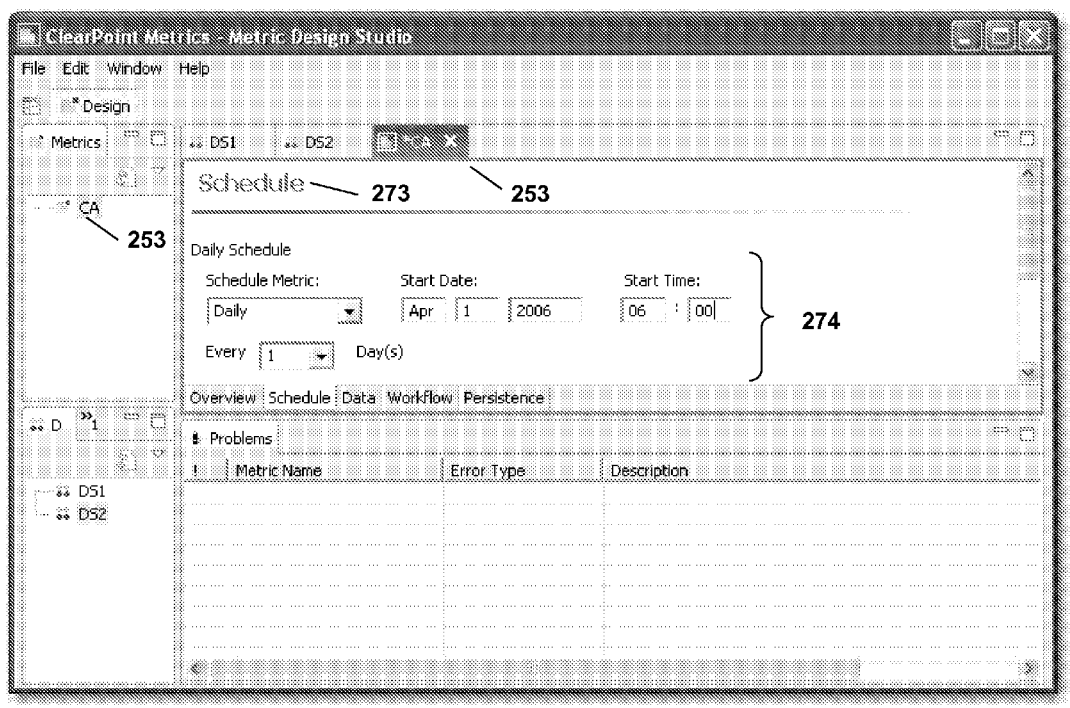

FIG. 2G shows the user interface 250 with the execution schedule 273 in the upper right panel. The detailed schedule 274 is set to the following parameters: execute frequency—daily, start date—Apr. 1, 2006, start time—6 am. It is evident that the scheduler is flexible to create many other different execution schedules such as weekly, monthly, quarterly, etc.

FIG. 2H shows a flowchart or process 280 for designing and deploying metrics in form of MDP in accordance with one embodiment of the invention. The process 280 may be implemented in software, hardware or a combination of both as a method, an apparatus or system. The process 280 starts with retrieving data from one or more distributed data sources at 282. The data sources may include, but not limited to, a log file, a spreadsheet, a common separated file, a database, and alike. In one embodiment, the data from different types of data sources can be mixed and matched via common schema or meta-data. The retrieved data is filtered at 284. For example, the data that needs filtering operation is repeated data, incorrect data, blank data, etc. After the data is filtered, modified or cleansed, a data transformation is performed at 286 to ensure that similar data from different data sources are mapped together. This can be done by mapping one set of data to be conformed to the definition of another set. It can also be done by mapping all of the similar data from all of the data sources into a canonical data definition, which is defined in an MDP independent of the data order in any one of the data sources.

Next at 288, the process 280 allows certain logic to be defined in accordance with the filtered and transformed data. For example, a type of logic may be created or defined with joining two data sets with a reference key to produce another set of results that can be used by others. The process 280 then creates an MDP at 290. The MDP is tested to check whether the desired results are indeed generated at 292. If the test 292 is not correct, the process 280 follows the "no" branch back to modify the logic defined at 288 until the test 292 produces desired results.

Depending on implementation, schedules to execute the MDP may be defined according to a need. Accordingly, the process 280 moves to set the MDP execution schedule at 294. If necessary, each designed MDP is assigned to a version number and may be so indicated in accordance with required conditions. For example, an MDP is designed to comply with the Sarbanes-Oxley Act for one type of business, and another MDP is designed in similar manner but to comply with the Sarbanes-Oxley Act for another type of business. Finally the process 280 saves and deploys the MDP in a metrics catalog to be accessed by a computing server (e.g., server 108 or 110 of FIG. 1A) at 296.

Figure 3A:
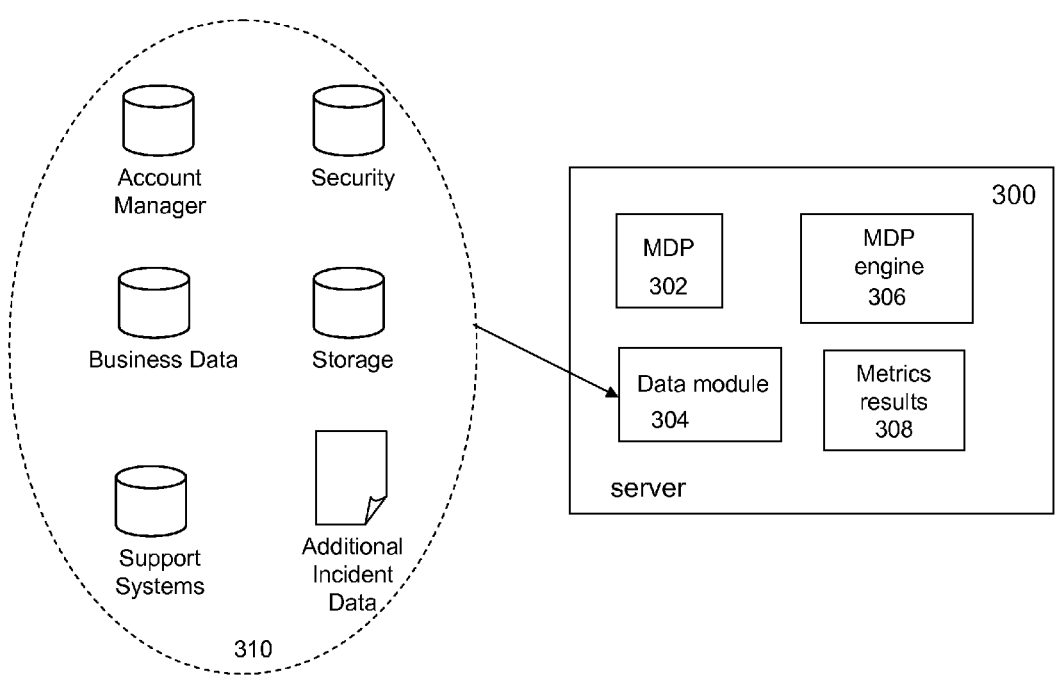
FIG. 3A shows a functional block diagram of a server 300 configured to execute the deployed MDP.

Referring to FIG. 3A, there shows a functional block diagram of a server 300 configured to execute the deployed MDP. In one embodiment, the MDP is loaded to a storage space coupled to or in the server 300 and ready to be accessed and executed. In accordance with the execution schedule defined within the MDP, the data module 304 is activated to sample at the time of executing the MDP by the MDP engine 306 various deployed resources by an enterprise that operates the server 300. The enterprise may have developed various deployed resources, such as a plurality of network storage spaces, security means, or subsystems. The data module 304 may be configured to collect various statuses of these deployed resources and/or corresponding data from authoritative data sources. The MDP engine 306 is configured to execute the MDP in conjunction with the data module 304.

Since the data collection from the deployed resources may be time dependent, the metrics may be executed with different data from the same data sources. Accordingly, the MDP engine 306 may be executed repeatedly according to the schedule. The executed metrics results are saved in a repository or database 308, perhaps with a timestamp and the corresponding conditions or parameters.

FIG. 3B shows a flowchart or process 380 for executing defined metrics in accordance with one embodiment of the invention. The process 380 may be implemented in software, hardware or a combination of both as a method, an apparatus or system. The process 380 may be readily understood in conjunction with FIG. 3A, and starts by loading one or more MDPs at 382. As described above, each of the MDPs is preferably designed in a separate device that may be remotely located with respect to the server 300. According to one embodiment, each one of the MDPs is deployed to the server respectively over a network. Accordingly, the process 380 checks whether the MDPs loaded are completely received at 384. The process 380 continues to load an MDP until all of the MDPs have been received in the server 300.

The process 380 moves to 386 to determine if the execution schedule defined in each of the MDPs is up. If not, the process 380 would continue to check the schedule until the test 386 is true. Then the process 380 executes the metrics in accordance with the schema, metadata, data and/or logic defined within the MDPs in conjunction with the data module 304 that collects various statuses, parameters, or conditions of related deployed resources in a confined environment (e.g., an enterprise environment). The information about the related deployed resources is comprehended (e.g., computed and/or analyzed) with the logic defined in the MDP(s) at 388. Subsequently, the process 380 collects or accumulates the metrics results (hence different versions thereof) from the execution of the metrics and stores the metrics results in database or a repository at 390.

The stored metrics results can be accessed later for a desired presentation. It is noted that the execution of the metrics may be performed by one centralized server or a plurality of distributed servers individually. According to one embodiment, executing the metrics in a plurality of distributed servers individually may provide some scalability and may also eliminate unnecessary data transmission among the servers.

Figure 4A:
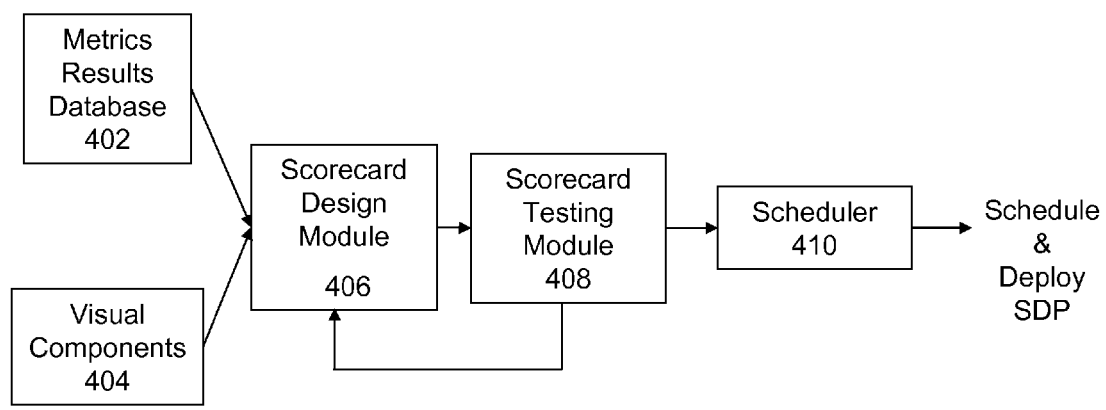
FIG. 4A shows a block diagram of designing a scorecard to present such distributed information as a scorecard in accordance with one embodiment of the invention.

One of the features in the present invention is to dynamically represent distributed information. In a certain perspective, the stored metrics results in the storage space 308 (e.g., database) are comprehended distributed information. FIG. 4A shows a block diagram of designing a scorecard to present such distributed information as one or more scorecards in accordance with one embodiment of the invention.

A scorecard is designed with various data 402 (e.g., the comprehended distributed information from the server 300 of FIG. 3A) in conjunction of various visual components 404 to provide easy-to-understand and comprehensive presentation for intended audience. According to one embodiment, the data for the scorecard is retrieved from the metrics results database or repository. The visual components may include, but not be limited to, graphs, charts, icons, widgets and the like. Essentially, a scorecard converts and presents static information stored in the metrics results database into dynamic, expandable, and browse-able representations.

According to one embodiment, the scorecard design module 406 is provided to receive the metrics results 402 across a network and the visual components 404 inputted by a designer at the same time. Examples of such scorecard designs include a representation of the static data in charts, graphs, pictures or data trends, or interaction or logic operation among different sets of data. A scorecard testing module 408 is provided to test the designed scorecard. If the presentation is not satisfied, the scorecard design module 406 is reactivated to modify the scorecard designs. In addition, the testing module 408 provides a utility to allow a user to manually or automatically enter inputs, for example, to annotate some of the presentation. As a result of the iterative process between the scorecard design module 406 and the scorecard testing module 408, the scorecard is approved in accordance with a workflow and set to be executed at a defined schedule by a scheduler 410 (e.g., hourly, daily, weekly, etc.).

Since the data for generating scorecards may be dependent upon the certain metrics results over a time period, the scheduling may depend on the completion of those certain metrics executions. For example, if a measurement over a particular time period needs to be presented in a scorecard, the data for the time period is retrieved from the previous executed metrics results over the time period for the particular measurement.

After the designed scorecard is satisfied, the design results from the scorecard testing module 408 are saved as a Scorecard Definition Package (SDP). According to one embodiment, an SDP includes various business logic, data definitions, data interactions, data calculations, annotations, texts, version numbers, and ways of presentation. According to another embodiment, an SDP includes hyperlinks to allow a view to incorporate additional data. Depending on implementation, an SDP may be browsed in a browser (e.g., Microsoft IE), viewed in PDF, readable in MS Word or PowerPoint. Similar to an MDP, an SDP can be stored and deployed in to a computing device such that a comprehensive view of the metrics about deployed resources across an enterprise may be provided whenever needed.

Figure 4B:
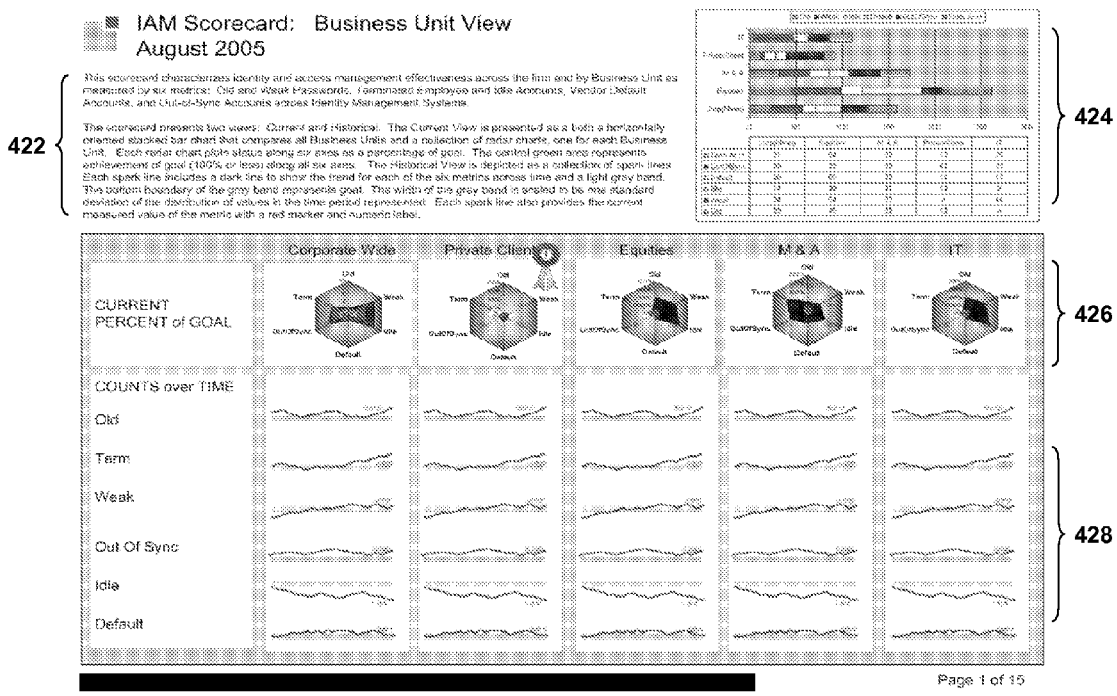
FIG. 4B shows an exemplary scorecard used in a corporation for security performance measurement in accordance with one embodiment of the invention.

FIG. 4B shows an exemplary scorecard 420 used in a corporation for security performance measurement in accordance with one embodiment of the invention. The exemplary scorecard 420 represents effectiveness measurement of Identity and Access Management (IAM) for the month of August 2005 from a business unit perspective in a corporation. In the scorecard 420, an annotation section 422 is included to describe the methodology used in each of the visual presentations of the scorecard. An overview chart 424 summarizes the measurements in a bar chart along with a table of the corresponding numerical data or statistics. A set of indicators 426 is shown with one graph for each of the business units (e.g., IT, Private Clients, Equities, M&A, etc.). Each of the graphical indicators 426 illustrates a summary view of each of the measurement categories (e.g., Old, Term, Out of Sync, etc.) in six corners of a hexagon. The trend of each of the measurement categories for each of the business units is plotted as a plurality of time history charts 428. It is evident that all of the relevant information for the IAM effectiveness of the corporation during the period of the measurement is presented in a concise and informative manner as shown in FIG. 4B.

Figure 4C:
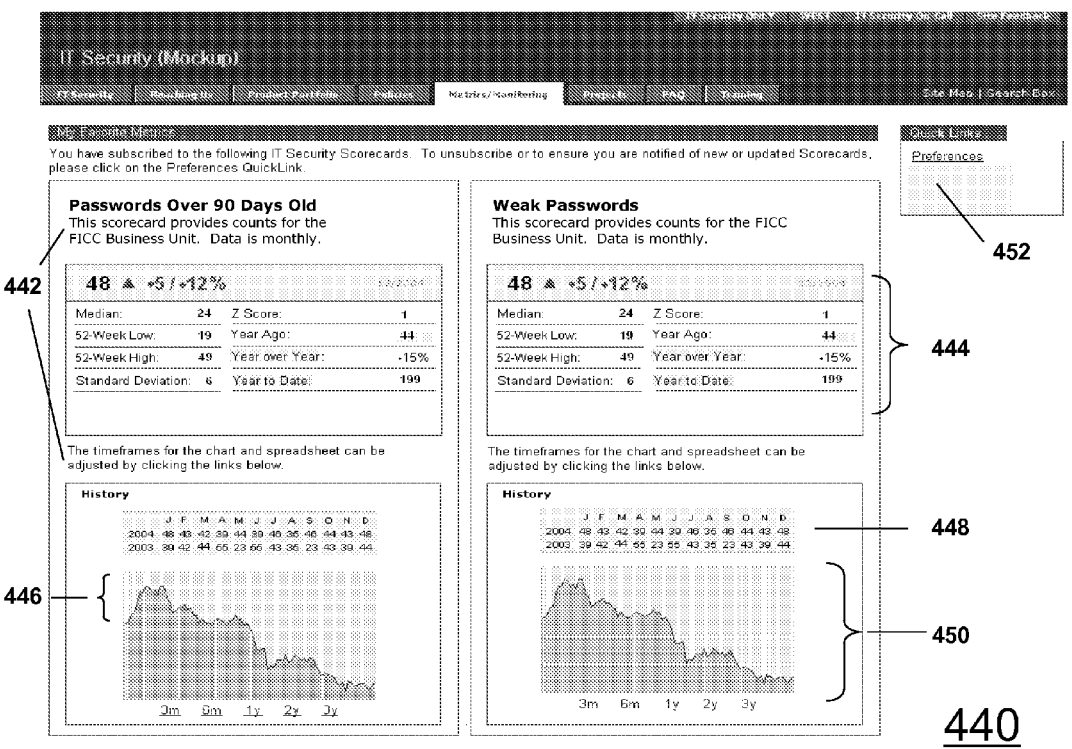
FIG. 4C shows another exemplary scorecard used in a corporation for IT security measurement in accordance with one embodiment of the invention.

FIG. 4C shows another exemplary scorecard 440 used in a corporation for IT security measurement in accordance with one embodiment of the invention. The scorecard 440 is related to IT security measurements (i.e., passwords). The scorecard 440 is presented under a subscription basis. Only the entitled viewers are allowed to subscribe through a link 452 (e.g., a button in a webpage based on a marked-up language). The scorecard 440 includes title, published date and annotations 442. The annotations 442 may be descriptions of the scorecard or opinions from an expert or simply an explanation of the graphical representations. The summary of the scorecard is presented as analytical results 444 (e.g., median, standard deviation, high, low, etc.) in a table. The analytical results may be computed using the logic defined in an SDP. The visual component of the scorecard 440 is a time history graph 450 representing the trend over various time periods. The numerical data 448 used for generating the time history graph 450 are listed for certain entitled audiences or users. In addition, a set of color-coded bands 446 is plotted overlapping the time history graph 450 to identify the current status visually. Alternatively, various colors may be used to highlight some important or more related information or data in a scorecard.

FIG. 4D shows a flowchart or process 470 for designing and deploying a scorecard in form of Scorecard Definition Package (SDP) in accordance with one embodiment of the invention. The process 470 may be implemented in software, hardware or a combination of both as a method, an apparatus or system. The process 470 may start by selecting an existing scorecard (e.g., a template or a designed scorecard) from a scorecard library at 472 or initiating a new design from scratch. At 474, the data representing various executed metrics results required for generating a corresponding scorecard is retrieved from the metrics results database or repository. Various visual components (e.g., graphs, icons, charts, wizards, etc) may be added at 476, and logic (e.g., data analysis, workflow, approval procedure, computations/operations, etc.) is incorporated at 478. Then a testing module is initiated to see how a designed scorecard is presented. Operationally, the scorecard may be annotated about specific objects or texts in the scorecard at 480.

The process 470 moves to a test 482, in which the scorecard being designed is checked out whether it is desired. If the presentation of the scorecard is not satisfied at 482, the process 470 moves back to 474 to modify the designs. The scorecard being designed is modified with different data, visual, or business logic. This iterative procedure continues until the test 482 is true. Then the process 470 sets access control to the scorecard at 484. For example, some scorecards are only used internally for a limited number of employees (e.g., the financial information to be reported can only be accessed by people responsible for finance). Other scorecards are public for everyone (e.g., press release).

Next at 486, a run schedule of the scorecard is set. It is similar to the schedule for executing metrics; the schedule for running the scorecards can be set as hourly, daily, etc. These two schedules are generally independent. However, because the data to generate scorecards are from the metrics results database, the run schedule of some scorecards may be dependent upon the completion of the execution of certain metrics. After the scorecard run schedule is set, the scorecard is versioned 488 to ensure the scorecard can be recreated, tracked and audited. And the scorecard is saved and deployed 490 as a Scorecard Definition Package (SDP) in a scorecard catalog to be accessed by a computing device later.

Figure 5A:
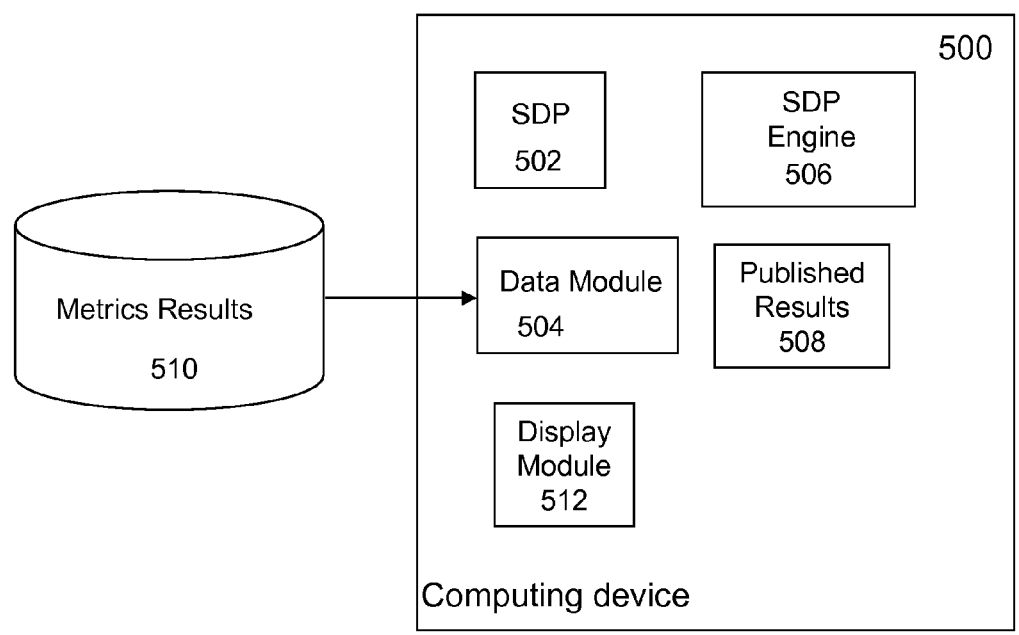
FIG. 5A shows block diagram depicting the execution of scorecard using SDPs deployed in a scorecard catalog in accordance with one embodiment of the invention.

FIG. 5A there shows a functional block diagram of a computing device 500 configured to execute the deployed SDP. In one embodiment, the SDP is loaded into a storage space coupled to or in the computing device 500 and ready to be accessed and executed. In accordance with the execution schedule defined within the SDP or externally, the data module 504 is activated to retrieve the metrics results from a database or repository 510. The data module 504 may be configured to retrieve the metrics results from more than one database or repository in different devices. The data module 504 may also be configured to receive additional data that may facilitate the presentation of the metrics results.

The SDP engine 506 is configured to execute the SDP in conjunction with the data module 504. Based on a schedule, data sources (i.e., executed metrics results) and logic defined in the SDPs are executed in the SDP engine 506 that subsequently generates the scorecard. Before publishing the scorecard, it is generally displayed on a display module 512 to ensure that the scorecard is what is desired. In one embodiment, the generated scorecard(s) is sent to the responsible authoritative parties to get approval, which may be embedded in the SDP so that the approval step must be executed by a designated person.

After the scorecard has been approved, the scorecard is published to a location 508 (e.g., a directory) that may be accessed by entitled personnel. In one embodiment, the scorecard is post on a web server for everyone to read. In another embodiment, the scorecard can only be accessed and viewed with a valid password. Alternatively, some portion of a scorecard can only be accessed by those who have subscribed. In yet another embodiment, a particular scorecard may have many different versions with each version designed for different audiences. For example, the executives of a corporation may get a very high level financial summary, while the accountants receive glory details of all of the data to generate the summary. Each of the published scorecards is archived to ensure that it can be tracked and audited.

FIG. 5B shows a flowchart or process 580 for executing and publishing scorecards in accordance with one embodiment of the invention. The process 580 may be implemented in software, hardware or a combination of both as a method, an apparatus or system. The process 580 starts with loading a designed SDP at 582.

At 584, the process 580 checks whether there are additional SDPs to be loaded. The loading of SDPs continues until the test 584 is false. The process 580 moves to the next test 586 to determine whether the scheduled run time of each of the SDPs is up. When the test 586 is true, the process 580 runs and generates respective scorecards or a collective scorecard in accordance with the data sources (i.e., one or more executed metrics results), and logic defined in the SDPs at 588. Next at 590, the generated scorecards are sent to the responsible authoritative persons for approval according to a business workflow logic defined in the SDPs. Once the scorecard is approved, the process 580 publishes the scorecard so that the entitled audiences may access appropriate levels of the scorecard at 592. Finally the process 580 archives the published scorecards at 594.

Although exemplary embodiments of the present invention have been disclosed in detail, it will be apparent to those skilled in the art that various changes and modifications may be made to achieve the advantage of the invention. It will be obvious to those skilled in the art that some components may be substituted with another component providing same function. Accordingly, the scope of the present invention is defined by the appended claims rather than the foregoing description of embodiments.

We claim:

1. A method for dynamically representing distributed information on a first computing device, the method comprising:

designing on the first computing device one or more metrics as a Metrics Definition Package that defines various business logic, workflows, and schema or metadata related to data sources;

transforming the data sources into a canonical form to facilitate further processing of the data sources;

filtering the data sources in accordance with the metrics being designed to minimize errors introduced by some data in the data sources;

joining data from two or more of the data sources together with a reference key to create a type of logic in the Metrics Definition Package;

deploying and executing on a second computing device the Metrics Definition Package based on metrics execution schedules against deployed resources in a predefined environment to produce executed metrics results; and representing on the first computing device the executed metrics results in at least one scorecard that includes various visual components, logic and schema or metadata related to the executed metrics so that the executed metrics results are presented in a dynamic manner, wherein the scorecard is used for monitoring and measuring deployed security means in an enterprise so as to indicate how effective the deployed security means is and what needs to be done with the deployed security means.

2. The method of claim 1, wherein the data sources pertain to at least one or more databases, spreadsheets, files, reports, and applications.

3. The method of claim 2, wherein the designing of the one or more metrics comprises:

determining the business logic in view of the data sources and the deployed resources; and embedding the business logic in the Metrics Definition Package.

4. The method of claim 3, wherein the business logic includes arithmetic, analytic or logic operations among any of the data sources with or without other supplemental data or logic.

5. The method of claim 1, wherein the Metrics Definition Package include characteristics of portability, autonomy, scalability and separation.

6. The method of claim 5, wherein the metrics has no dependency upon specific external systems that are eventually used to populate the data sources when the Metrics Definition Package is executed.

7. The method of claim 6, wherein the designing of the one or more metrics is physically and logically distinct from an environment in which the metrics are to be executed to generate results.

8. The method of claim 7, wherein the Metrics Definition Package includes a workflow to determine how the metrics results are derived.

9. The method of claim 7, wherein the Metrics Definition Package determines exactly when the Metrics Definition Package is executed.

10. The method of claim 1, wherein the executing of the Metrics Definition Package further comprises:

collecting data, status, parameters about each of the deployed resources; and archiving the executed metrics results.

11. The method of claim 10, wherein the executed metrics results are saved in a repository, each of the executed metrics results includes a timestamp to indicate when and what conditions the each of the executed metrics results is obtained.

12. The method of claim 1, wherein the representing of the executed metrics results comprises:

providing various visual components;

receiving the executed metrics results; and designing the logic among the metrics results.

13. The method of claim 12, wherein the scorecard includes the visual components and the logic as a Scorecard Definition Package that is to be executed in a computing device.

14. The method of claim 13, wherein the representing of the executed metrics results further comprises annotating the scorecard and versioning the Scorecard Definition Package.

15. The method of claim 14, wherein the scorecard is repeatable, trackable and auditable.

16. The method of claim 13, wherein the visual components include at least one of a graph, a chart, an icon, colors and a wizard.

17. The method of claim 12, wherein the logic in the scorecard includes an access control so that only an appropriate audience sees an appropriate level of the scorecard.

18. The method of claim 1, wherein the scorecard converts the executed metrics results into dynamic browse-able and expandable representation.

19. A system for dynamically representing distributed information, the system comprising:

a first computing device configured to design one or more metrics as a Metrics Definition Package that defines metrics execution schedules, relationships or logic of data sources and metrics logic, and transform the data sources into a canonical form to facilitate further processing of the data sources;

a second computing device deployed with the Metrics Definition Package and configured to execute the Metrics Definition Package based on the metrics execution schedules to produce executed metrics results, wherein the second device is coupled to a plurality of deployed resources in a predefined environment, wherein the second computing device is configured to filter the data sources in accordance with the metrics being designed to minimize errors introduced by some data in the data sources; and join data from two or more of the data sources together with a reference key to create a type of logic in the Metrics Definition Package; and a third computing device configured to represent the executed metrics results in at least a scorecard that includes various visual components and logic so that the executed metrics results are presented in a dynamic manner, wherein the scorecard is provided for monitoring and measuring deployed security means in an enterprise so as to indicate how effective the deployed security means is and what needs to be done with the deployed security means.

20. The system as recited in claim 19, wherein the second computing device is a server coupled to a storage space that accumulates the executed metrics results to be accessed by the third computing device to represent the executed metrics results in a dynamic and comprehensive manner.

21. The system as recited in claim 20, wherein the metrics logic includes manipulations among any of the data sources with or without other supplemental data or logic.

22. The system as recited claim 20, wherein the Metrics Definition Package include characteristics of portability, autonomy, scalability and separation.

23. The system as recited claim 22, wherein the metrics is defined in terms of meta-data of the data sources, and has no dependency upon the second computing device to populate the data sources when the Metrics Definition Package is executed.

* * * * *